(12) United States Patent
Zhu (10) Patent No.: US 12,158,363 B2
(45) Date of Patent: Dec. 3, 2024

(54) TECHNIQUES AND APPARATUS FOR IMPROVED SPATIAL RESOLUTION FOR LOCATING ANOMALIES IN OPTICAL FIBER

(71) Applicant: SUBCOM, LLC, Eatontown, NJ (US)

(72) Inventor: Rong Zhu, Eatontown, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 18/096,595

(22) Filed: Jan. 13, 2023

(65) Prior Publication Data
US 2023/0152131 A1    May 18, 2023

Related U.S. Application Data

(62) Division of application No. 17/389,742, filed on Jul. 30, 2021, now Pat. No. 11,566,921.

(Continued)

(51) Int. Cl.
*G01D 5/353* (2006.01)
*G01K 11/322* (2021.01)
(Continued)

(52) U.S. Cl.
CPC ....... *G01D 5/35364* (2013.01); *G01K 11/322* (2021.01); *G01L 1/242* (2013.01); *G01M 11/3109* (2013.01)

(58) Field of Classification Search
CPC ............. G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01D 5/35358;
(Continued)

(56) References Cited

U.S. PATENT DOCUMENTS

| 4,767,219 A | 8/1988 | Bibby |
| 7,995,198 B2 | 8/2011 | Sasaoka |

(Continued)

FOREIGN PATENT DOCUMENTS

CN    101506637 A  *  8/2009  ............. G01B 11/18

OTHER PUBLICATIONS

Zou et al., Brillouin Scattering in Optical Fibers and Its Application to Distributed Sensors, Chapter 1, http://dx.doi.org/10.5772/59145, pp. 51.

(Continued)

*Primary Examiner* — Gordon J Stock, Jr.
(74) *Attorney, Agent, or Firm* — KDW Firm PLLC (57) ABSTRACT

Methods of measuring an anomaly, any induced change in physical parameters such as strain, temperature, and so forth, in an optical fiber. One method may include launching a plurality of probe pulses from a probe source; recording a Brillouin scattering spectrum from a plurality of reflection signals generated in the optical fiber, responsive to the plurality of probe pulses; determining a relative motion between the optical fiber and the anomaly during the recording the Brillouin back-scattering spectrum; and dynamically adjusting the Brillouin back-scattering spectrum according to the relative motion, or performing an adjustment of the Brillouin back-scattering spectrum after acquisition of the Brillouin back-scattering spectrum.

5 Claims, 8 Drawing Sheets

Related U.S. Application Data (60) Provisional application No. 63/129,295, filed on Dec. 22, 2020, provisional application No. 63/059,633, filed on Jul. 31, 2020.

(51) Int. Cl.
*G01L 1/24* (2006.01)
*G01M 11/00* (2006.01)

(58) Field of Classification Search
CPC .............. G01D 5/35361; G01D 5/35364; G01L 1/242; G01N 2021/638; G01J 3/4412; G01K 11/322
See application file for complete search history.

(56) References Cited

U.S. PATENT DOCUMENTS

| | | | |
|---|---|---|---|
| 8,144,314 B2 | 3/2012 | Yamamoto | |
| 8,699,009 B2* | 4/2014 | Li | G01M 11/083 356/33 |
| 8,744,782 B2 | 6/2014 | Chen | |
| 8,982,340 B2 | 3/2015 | Peled | |
| 9,885,619 B2 | 2/2018 | Tur | |
| 10,677,616 B2 | 6/2020 | Soga | |
| 10,794,733 B2 | 10/2020 | Lanticq | |
| 11,566,921 B2* | 1/2023 | Zhu | G01D 5/35364 |
| 11,611,393 B1* | 3/2023 | Bolshtyansky | H04B 10/60 |
| 2006/0018586 A1 | 1/2006 | Kishida | |
| 2006/0239330 A1 | 10/2006 | Yamate | |
| 2006/0285850 A1* | 12/2006 | Colpitts | G01D 5/35364 374/E11.015 |
| 2009/0008536 A1 | 1/2009 | Hartog | |
| 2013/0308682 A1 | 11/2013 | Tur | |
| 2016/0109223 A1* | 4/2016 | Wang | G01K 11/32 356/32 |
| 2018/0045542 A1 | 2/2018 | Ramirez-Mancilla | |
| 2021/0190550 A1 | 6/2021 | Handerek | |
| 2022/0170766 A1* | 6/2022 | Hino | G01H 9/004 |
| 2022/0390260 A1* | 12/2022 | Gabai | G01H 9/004 |

OTHER PUBLICATIONS

Bolognini et al, Raman-based fibre sensors: Trends and applications, Optical Fiber Technology 19 (2013) 678-688, Optical Fiber Technology, www.elsevier.com/locate/yofte, pp. 11.

Bao et al., Recent Progress in Brillouin Scattering Based Fiber Sensors, Sensors 2011, 11, 4152-4187; doi: 10.3390/s110404152, ISSN 1424-8220, www.mdpi.com/journal/sensors, pp. 36.

* cited by examiner

TECHNIQUES AND APPARATUS FOR IMPROVED SPATIAL RESOLUTION FOR LOCATING ANOMALIES IN OPTICAL FIBER

RELATED APPLICATIONS

This application is a divisional of U.S. patent application Ser. No. 17/389,742, filed Jul. 30, 2021, entitled Techniques and Apparatus for Improved Spatial Resolution for Locating Anomalies in Optical Fiber, which claims priority to U.S. provisional patent application Ser. No. 63/129,295, filed Dec. 22, 2020, entitled Techniques and Apparatus for Improved Spatial Resolution for Locating Anomalies in Optical Fiber, and further claims priority to U.S. provisional patent application Ser. No. 63/059,633, filed Jul. 31, 2020, entitled Techniques and Apparatus for Improved Spatial Resolution for Locating Anomalies in Optical Fiber, each of which application is incorporated by reference herein in its entirety.

FIELD OF THE DISCLOSURE

This disclosure relates generally to the field of optical communication networks and relates more particularly to techniques for distributed measuring moving anomalies in optical fibers. As used herein an anomaly may refer to any change in physical parameters induced in the fiber, including strain, temperature, and so forth.

BACKGROUND

Optical fibers are employed ubiquitously for applications such as communications in land and sea based technology. For example, optical fibers having lengths as great as 100 km or more are commonly employed in undersea fiber optic cables. These undersea fiber optic cables are commonly employed for transmitting data across expanses of ocean between terrestrial landing sites which are often located in different countries and on different continents.

Techniques including backscattering techniques, such as Brillouin Optical Time Domain Reflectometry have been adapted for analyzing defects or anomalies in optical fibers, either intrinsic or induced by environmental physical parameters around the optical fibers, where defects may be located at any position along many kilometers of an optical fiber. This technique may be used to determine the location of strain or temperature differences in an optical fiber. This technique is non-destructive and therefore allows for measurement of the optical fiber at any suitable location, including at the factory, during installation, or in-situ after installation of an optical cable.

Notably, a backscattering measurement may be performed as a distributed measurement at multiple wavelengths, to allow the acquisition of sufficient distributed spectral property information. During backscattering measurement such as when manufacturing and deploying cable, a relative motion may take place between the optical fiber used as a sensor and the location and distribution of fiber anomalies or physical parameters. This relative motion may accordingly skew the spatial profile of spectral properties from the backscattering measurements, as required to determine the profile of physical parameter within the fiber, leading to degraded spatial resolution and therefore limited accuracy.

It is with respect to these and other considerations that the present improvements may be useful.

BRIEF SUMMARY

A method of measuring an anomaly in an optical fiber is provided according to one embodiment. The method may include launching a plurality of probe pulses from a probe source into the optical fiber; recording a Brillouin back-scattering spectrum from a plurality of reflection signals generated in the optical fiber, responsive to the plurality of probe pulses; determining a relative motion between the probe source and the anomaly during the recording the Brillouin back-scattering spectrum; and dynamically adjusting the Brillouin scattering spectrum according to the relative motion.

In another embodiment, a method of measuring an anomaly in an optical fiber, may include measuring a relative motion between a probe source and the anomaly; synchronizing a start of an acquisition of a Brillouin gain spectrum (BGS) and an anomaly motion detection, wherein the BGS comprises a plurality of backscatter traces, acquired at a plurality of instances; and after completing of the acquisition of the BGS, correcting the BGS based on a position of the anomaly at a time when a given BGS trace of the plurality of BGS traces is acquired.

In a further embodiment, an apparatus is provided, including a probe source; a pulse modulator to receive first portion of a probe beam from laser, over an optical fiber, and to output a plurality of probe pulses to a fiber under test; and a heterodyne receiver arranged to receive second portion of the probe beam from the probe source, and arranged to receive a Brillouin back-scattered portion of the probe beam from an anomaly of a fiber under test. The apparatus may further include a motion sensor or a position sensor, arranged to detect a relative motion or position, with respect to the fiber under test; and a digital processor, coupled to the motion sensor or to the position sensor, for determining a relative motion of the optical fiber/probe source with respect to the anomaly while measuring the Brillouin back-scattered portion of probe beam.

DETAILED DESCRIPTION

Exemplary embodiments of a measurement arrangement and techniques for testing an optical fiber, will now be described more fully with reference to the accompanying drawings. The measurement arrangement and techniques may be especially suitable for testing and measurement of optical fibers when deployed in circumstances where relative movement of a given anomaly in the optical fiber with respect to the optical fiber takes place during measurement. As used herein an anomaly may refer to any change in physical parameters induced in a fiber, including strain, temperature difference, and so forth. For example, it may be useful to measure a strain/temperature profile induced in an optical fiber, then environmental temperature/strain profile, where relative motion takes place between a sensing fiber of a measurement apparatus and the environmental temperature/strain profile during measurement. This circumstance may obtain when an optical fiber, such as a fiber under test, is being measured while deployed underseas, where at least a portion of the measurement apparatus is located on a ship or other vessel. Another circumstance is when a fiber is under test while being cabled, where the fiber is in motion relative to the cabling apparatus.

Figure 1A:
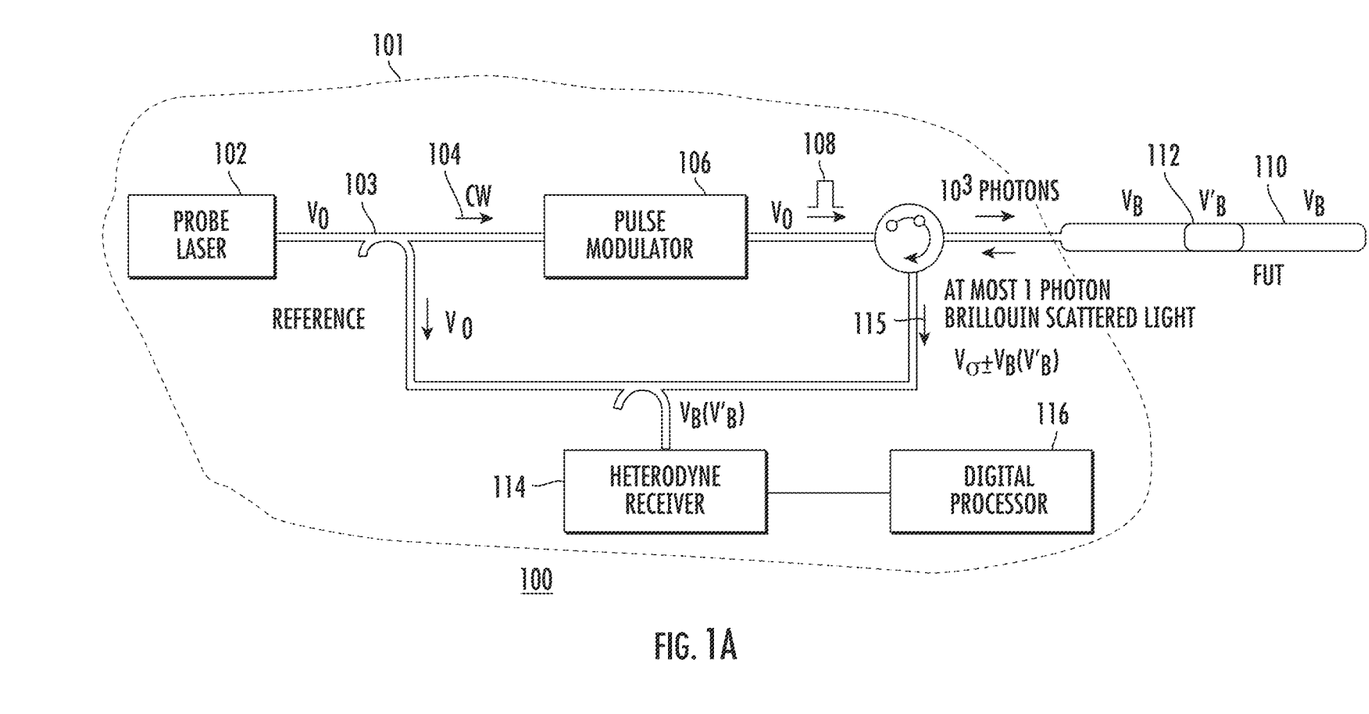
FIG. 1A is a schematic diagram illustrating a conventional measurement arrangement for testing an optical fiber, according to the prior art.

Referring to FIG. 1A, there is shown a schematic diagram illustrating an example of a measurement arrangement 100 according to the prior art for testing an optical fiber, in accordance with the present disclosure. In this embodiment, a measurement apparatus 101 is depicted with respect to a fiber under test (FUT), shown as optical fiber 110. The optical fiber 110 may be arranged in any suitable form and location, for example, in an undersea fiber optic cable, or alternatively in a terrestrial setting. The measurement apparatus 101 may include a probe source 102, to probe the optical fiber 110, such as a probe laser, arranged to generate a probe beam 104 at a suitable wavelength for probing the optical fiber 110. The measurement apparatus 101 may further include a pulse modulator to receive a first portion of a probe beam 114 from the probe source 102, over a sensing fiber 103, and to output a plurality of probe pulses 108 to a fiber under test, shown as optical fiber 110.

As shown in FIG. 1A, the probe pulses 108 are generated at a frequency $\upsilon_0$, and are characterized by a pulse width. The probe pulses, when conducted to the fiber under test, optical fiber 110, may encounter an anomaly 112, such as a temperature/strain change, where the anomaly may generate Brillouin scattering of the probe pulses 108.

By way of background, when light enters an optical fiber photons may be scattered back toward the optical source, as well as forward. Brillouin scattered light is shifted in frequency from the original frequency of the probe beam toward lower frequency or higher frequency. More particularly, Brillouin scattering may be generated by inelastic scattering of light in a physical medium by acoustical phonons with an accompanying Brillouin Frequency Shift (BFS). Both temperature and strain affect the medium density, then acoustic velocity $\upsilon_a$ and cause changes in the frequency of the Brillouin frequency shift $v_{BFS}$.

Techniques including Brillouin Optical Time Delay Reflection (BOTDR) and Brillouin Optical Time Delay Analysis (BOTDA) harness the measurement of Brillouin scattered light to measure anomalies, such as localized strain changes or localized temperature changes in an optical fiber, where the localized or distributed strain will affect the Brillouin frequency shift. Generally, for Brillouin scattering, the change in BFS frequency can be represented as $$\Delta v_{BFS} = C_T \cdot \Delta T + C_\varepsilon \cdot \Delta \varepsilon \quad (1)$$

where $C_T$ is approximately in the range of 0.75 MHz/C and $C_\varepsilon$ is in the range of 500 MHz/1% strain, where equation (1) forms the foundation of temperature/strain measurement based on detection of Brillouin Scattering, for both BOTDR and BOTDA.

In accordance with embodiments of the disclosure, the measurement apparatus 101 may be used to perform Brillouin Optical Time Delay Reflection as detailed below. For purposes of illustration, as shown in FIG. 1A, when a packet of $10^3$ photons are directed to the anomaly 112, generally one photon or less on average is scattered as Brillouin scattered light, meaning that the Brillouin scattering yield is less than or equal to 0.1 percent of the initial photons directed to the anomaly.

As depicted in FIG. 1A, the measurement apparatus 101 further includes a heterodyne receiver 114 that is arranged to receive a second portion of the probe beam 104 from the probe source (at frequency Do), and that is further arranged to receive a Brillouin scattered portion 115 of the probe beam, scattered from the anomaly 112 of the fiber under test, optical fiber 110. As shown in FIG. 1A, this Brillouin scattered portion 115 is received at a frequency $\upsilon_0 +/- \upsilon_B$, where $\upsilon_B$ is the Brillouin frequency shift generated by the anomaly 112.

As further shown in FIG. 1A, the measurement apparatus 101 further includes a digital processor 116, coupled to the heterodyne receiver 114, and arranged to detect a position of the probe source with respect to the anomaly 112 while measuring the Brillouin scattered portion 115 of probe beam 104. In accordance with various embodiments of the disclosure, the probe source 102 and heterodyne receiver 114, as well as digital processor 116 may be collocated with one another, where the distance between probe source 102 and anomaly 112 may be approximately the same as the distance between heterodyne receiver 114 and anomaly 112. Thus, the relative position of the heterodyne receiver 114 and anomaly 112 may be taken to be the relative distance between probe source 102 and anomaly 112.

According to embodiments of the disclosure, the apparatus 101 may be employed to generate a Brillouin gain spectrum (BGS) based on probing on the anomaly 112 in the fiber under test, optical fiber 110.

A Brillouin gain spectrum may generally comprise a plurality of backscatter traces, acquired at different instances. A given pulse of the plurality of pulses is launched at a frequency $v_0$, as shown in FIG. 1A, for example, where a given backscatter trace along the optical fiber is detected by the heterodyne receiver 114 at a frequency $v_B$, offset from the frequency $v_0$. Notably, the plurality of backscatter traces may span a predetermined frequency range that is characteristic of the Brillouin backscattering shift for a given fiber system, depending on the properties of the anomaly, as shown above for equation (1).

More particularly, the measurement apparatus 101 may acquire a BGS along an optical fiber in the following manner: For each launched pulse at $v_0$, the back-scattered signal trace along the fiber at $v_B$ is detected by the heterodyne receiver 114, while multiple probe pulses 108 are launched by the pulse modulator 106 to improve the signal-to-noise ratio of the BGS. The heterodyne receiver 114 may step the frequency through a full coverage of a predetermined frequency range to acquire the entire BGS. Notably, as discussed below with respect to FIGS. 4A and 4B, a BGS may be presented as a three-dimensional graph plotting BGS intensity as a function of distance along a fiber on one axis and Brillouin frequency shift along an orthogonal axis. Generally in a BGS, the spatial resolution is determined by the pulse width of the probe pulse, such as probe pulse 108, while the total time for data acquisition of the entire BGS includes the scan duration for every frequency step.

Notably, in measurement scenarios where there is relative motion between a sensing fiber and an anomaly such as a steady temperature and strain profile in the fiber under test, assuming that the relative motion, V, <<Speed of light in fiber for simplicity, the spatial resolution will be determined not only by the pulse width of a launched pulse but also by V. The spatial resolution of a BGS may then be equal to the sum of the limitation due to limited pulse width and the spatial distance of the relative motion during the duration between the start and end of frequency sweeping.

In one example of generating an adjusted BGS, the first trace of a BGS may be collected for a first frequency step of $-\Delta v$, where the adjustment is as follows: $I_{11}(-\Delta v, x) \rightarrow I'_{11}(-\Delta v, x) = I_{11}(-\Delta v, x)$. In this example, the intensity at $-\Delta v$, x is mapped to the same coordinates in a graph where distance (x) and frequency $-\Delta v$ are parameters plotted in an "X-Y" plane and BGS intensity I is plotted along a Z-axis of a Cartesian graph.

The Nth trace of the BGS may be collected for the same first frequency of $-\Delta v$, where the adjustment is as follows $-\Delta v$: $I_{1N}(-\Delta v, x) \rightarrow I'_{1N}(-\Delta v, x) = I_{1N}(-\Delta v, x-d_{1N})$, where $d_{1N}$ the distance moved away along the direction of the pulse launch since the $1^{st}$ trace scan at the $1^{st}$ frequency step.

The $N^{th}$ trace of the BGS may be collected for a different frequency of $-\Delta v+m \times \delta v$: $I_{mN}(-\Delta v+m \times \delta v, x$ as follows$\rightarrow I'_{mN}(-\Delta v+m \times \delta v, x) = I_{mN}(-\Delta v+m \times \delta v, x-d_{mN})$, where $d_{mN}$ is the distance moved away along the direction of pulse launch since the $1^{st}$ trace scan at the $1^{st}$ frequency step, and $(-\Delta v, \Delta v)$ and is $\delta v$ the frequency range and step, respectively.

In the above manner, an initially unadjusted BGS may be adjusted and reconstructed as an adjusted BGS to account for movement of the anomaly with respect to the fiber as sensor during collection of the BGS spectrum. FIG. 2 illustrates a schematic showing components of a measurement arrangement according to the present embodiments that incorporates components of the arrangements of FIG. 1A or FIG. 1B for incorporating motion correction techniques during operation. As shown therein, the anomaly 112 may be represented as a moving profile of local temperature/strain changes in the fiber under test. Said differently, the location or spatial distribution of the anomaly 112 may change in the optical fiber 110 under test during collection of a BGS, resulting in a moving profile as shown. The measurement apparatus 101 may in turn collect this information (position d) in real time at the digital processor 116, to account for the change in relative position of the anomaly 112 with respect to the optical fiber 110 under test, thus facilitating the ability to generate an adjusted BGS.

Figure 1B:
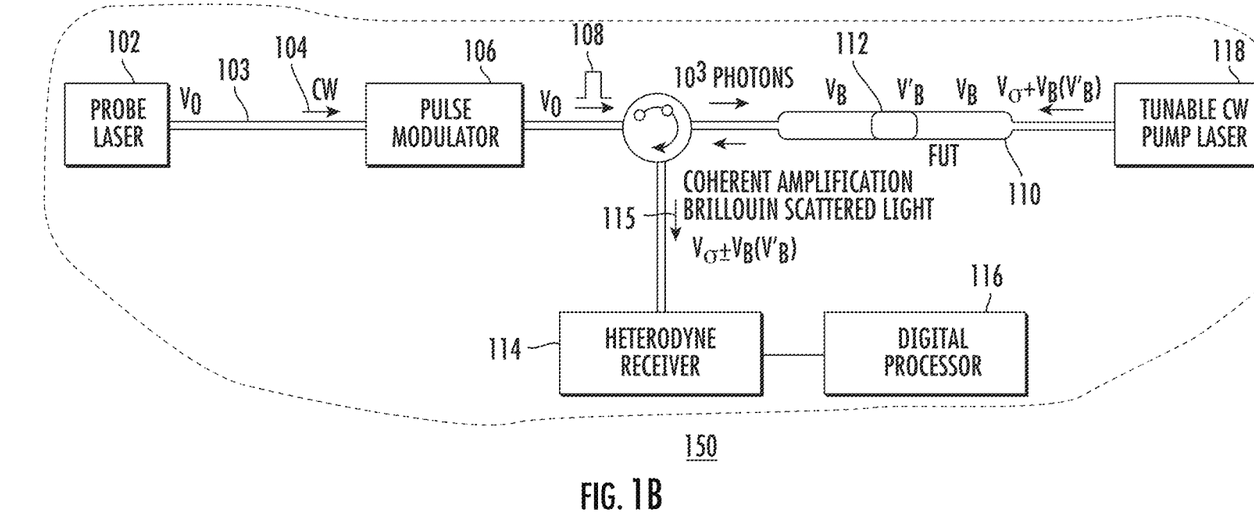
FIG. 1B is a schematic diagram illustrating another conventional measurement arrangement for testing an optical fiber, according to the prior art.
Figure 2:
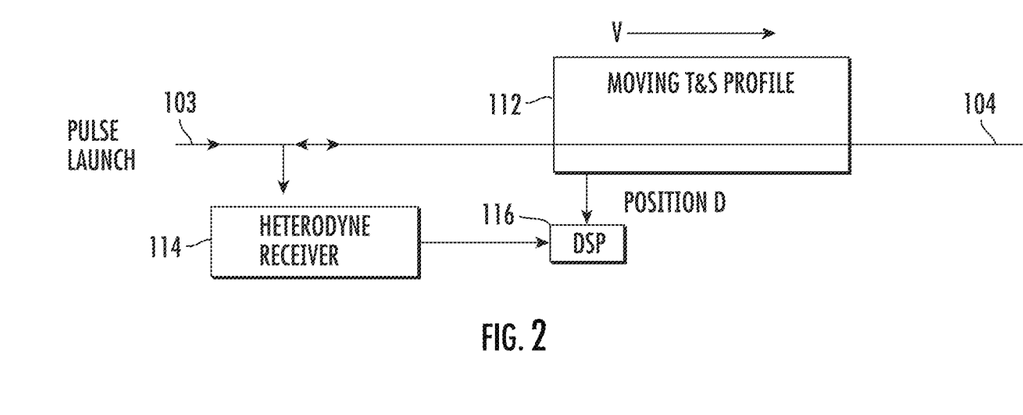
FIG. 2 illustrates a schematic showing components of a measurement arrangement according to the present embodiments that incorporates components of the arrangements of FIG. 1A or FIG. 1B during operation.

Turning now to FIG. 1B there is shown a schematic diagram illustrating another conventional measurement arrangement 150, according to the prior art, for testing an optical fiber, in accordance with the present disclosure. In this example, the measurement apparatus 151 shares similar components with measurement apparatus 101, with like components labeled the same. As such, operation of these components will not be discussed in detail. The measurement apparatus 151 differs from measurement apparatus 101 in that a pump source 118 is provided, coupled to an opposite end of the optical fiber 110 as the probe source 102. The pump source 118 may be a tunable CW laser, for example. As such, the measurement apparatus 151 may be suitable to perform Brillouin Optical Time Delay Analysis (BOTDA) for the fiber under test, where the scattering from the acoustic wave stimulated by the probe pulses 108 at anomaly 112 is amplified by counter-propagated CW pump light launched from the other end of the fiber under test, e.g., generating Stimulated Brillouin Scattering (SBS). In such implementations, the BOTDA measurement approach generates a much better signal to noise ratio than BOTDR, then longer reach, and better frequency and spatial resolution. During collection of a BGS using the measurement apparatus 151, the relative motion of the anomaly 112 with respect to the fiber 110 under test may be recorded and taken into account to generate an adjusted BGS, generally as discussed above with respect to FIG. 1A. Notably, the arrangement of FIG. 1B requires access to both ends of a fiber under test.

Figure 3A:
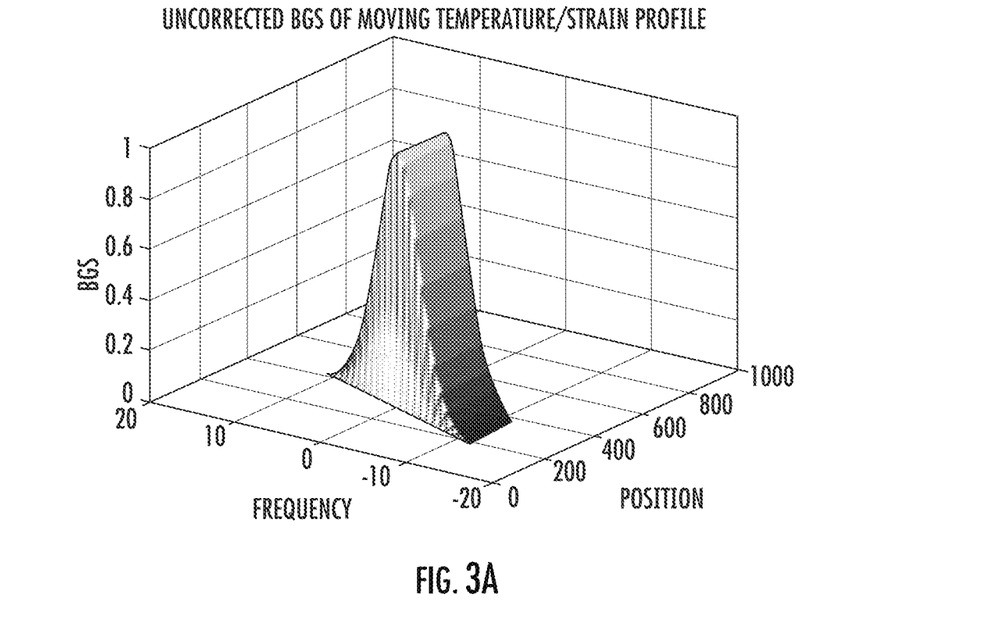
FIG. 3A illustrates a reference Brillouin gain spectrum resulting from measurement of a moving anomaly in an optical fiber.
Figure 3B:
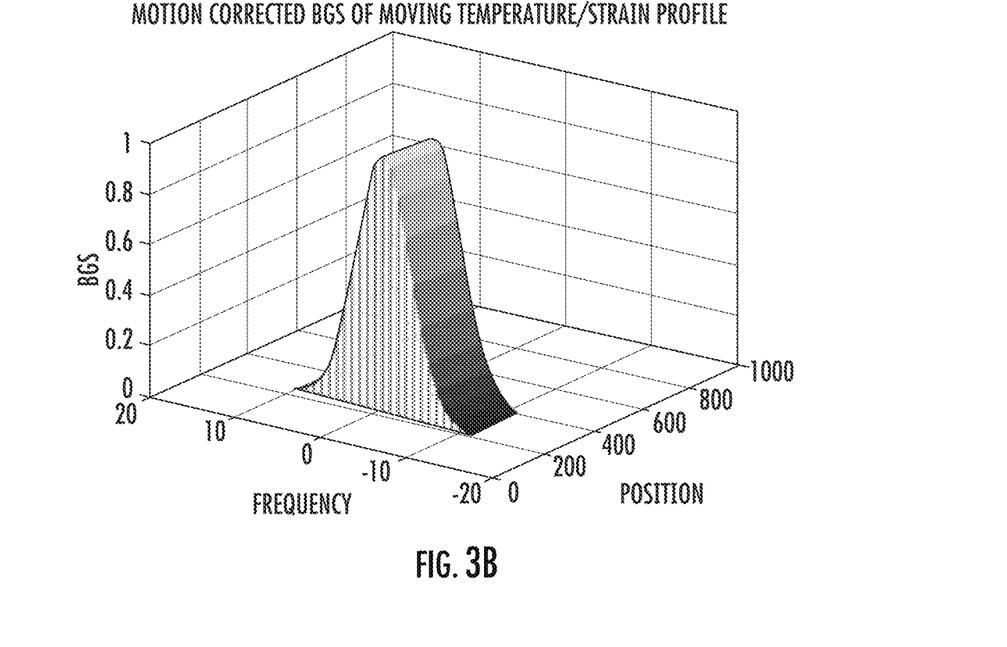
FIG. 3B illustrates a Brillouin gain spectrum resulting from measurement of the moving anomaly of FIG. 3A after correction for movement during the measurement or after the measurement, in accordance with embodiments of the disclosure.

FIG. 3A illustrates a reference Brillouin gain spectrum resulting from measurement of a moving anomaly in an optical fiber. FIG. 3B illustrates a Brillouin gain spectrum resulting from measurement of the moving anomaly of FIG. 3A after correction for movement during the measurement, in accordance with embodiments of the disclosure. These spectra are simulated spectra to illustrate operation of the present embodiments. In FIG. 3A, BGS intensity is plotted on the Z-axis, while Frequency and distance are plotted on mutually orthogonal axes in the "X-Y" plane. The values of frequency and position are arbitrary. As shown, the BGS is generated by a plurality of traces represented by the vertical planes, where the intensity increases to a peak that is centered about zero frequency. Notably, the peak in BGS intensity at each successive frequency step is shifted along the "position" axis with respect to the prior frequency step.

In FIG. 3B, a BGS is shown that is derived from the BGS of FIG. 3A, where the relative movement of the anomaly during BGS acquisition is accounted for, such as described above. In this example, the BGS peak caused by the anomaly does not shift in position with the different frequency steps.

Figure 4A:
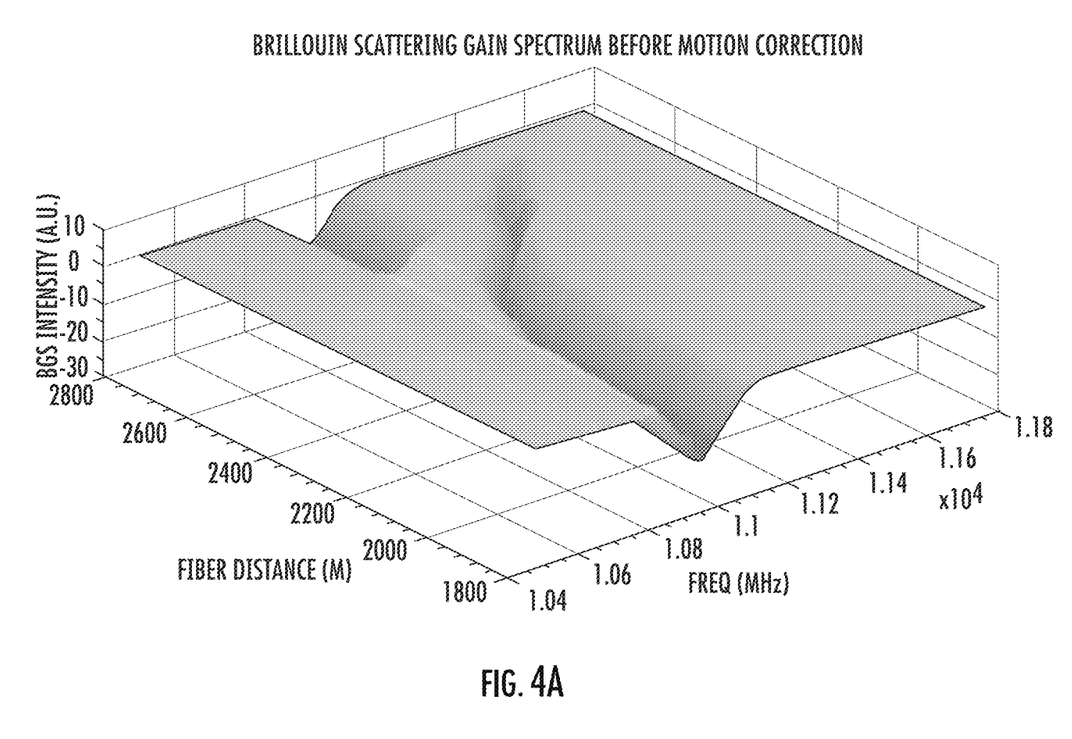
FIG. 4A illustrates a Brillouin gain spectrum resulting from measurement of a moving anomaly in an optical fiber, where Brillouin back-scattering intensity is plotted as a function of frequency and distance.
Figure 4B:
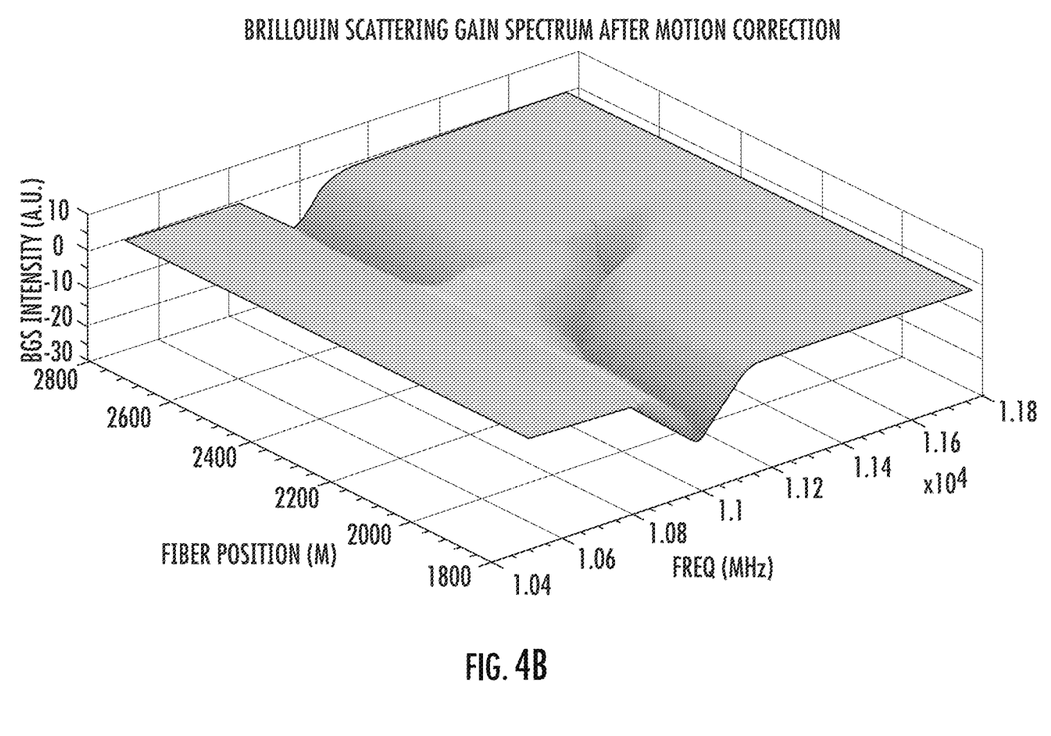
FIG. 4B illustrates an adjusted Brillouin gain spectrum resulting from correction of the Brillouin gain spectrum of FIG. 4A to account for movement of the anomaly during measurement, in accordance with embodiments of the disclosure.

FIG. 4A illustrates a Brillouin gain spectrum resulting from measurement of a moving anomaly in an optical fiber, where Brillouin scattering intensity is plotted as a function of frequency and distance. FIG. 4B illustrates an adjusted Brillouin gain spectrum resulting from correction of the Brillouin gain spectrum of FIG. 4A to account for movement of the anomaly during measurement, in accordance with embodiments of the disclosure. These spectra are experimentally measured. For better visibility the BGS is reversed. In FIG. 4A there are actually two spectral peaks that are discernable. In FIG. 4B, a single well defined peak is observed, where the distance is shifted 100 m or so than is apparent in FIG. 4A. Thus the position of the anomaly is more accurately and precisely determined.

Figure 5:
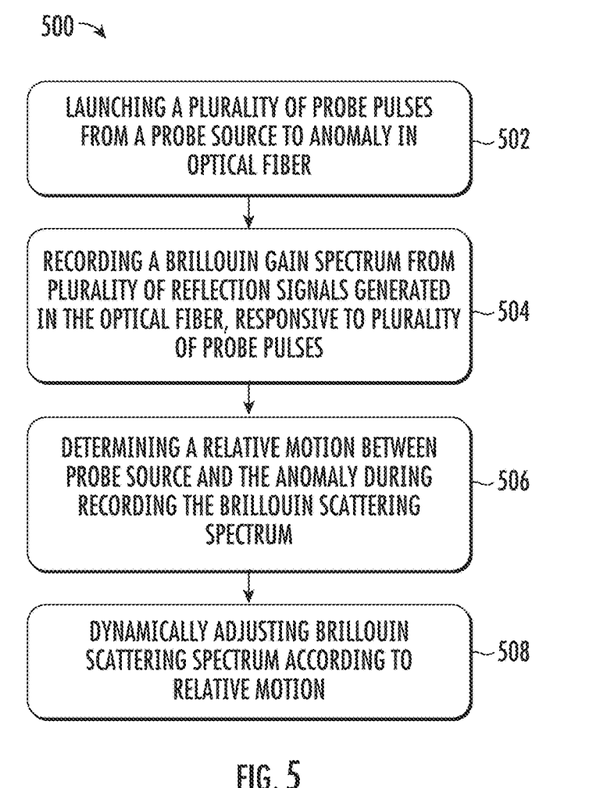
FIG. 5 presents an exemplary process flow.

FIG. 5 presents an exemplary process flow 500, in accordance with embodiments of the disclosure. At block 502 a plurality of probe pulses are launched from a probe source, such as a laser source. The plurality of probe pulses may be output by a pulse modulator, coupled to the laser source. The plurality of probe pulses may be output over a given time interval and may be directed to an anomaly of an optical fiber that represents a fiber under test.

At block 504 a Brillouin gain spectrum is recorded from a plurality of reflection signals generated in the optical fiber, responsive to the plurality of probe pulses. In some examples, a group of reflection signals may be collected by a heterodyne receiver for each frequency step of a series of frequency steps centered around a characteristic frequency, representing the Brillouin frequency shift generated by an anomaly in the fiber under test. In various embodiments, the anomaly may be characterized as a local change in strain/temperature in the optical fiber, where a change in Brillouin frequency $\Delta v_{BFS}$ is generated according to $\Delta v_{BFS} = C_T \cdot \Delta T + C_\varepsilon \cdot \Delta \varepsilon$, where $C_T$ represents the frequency shift per degree Celsius change in temperature, and $C_\varepsilon$ is the change in frequency per % strain in the optical fiber. In some non-limiting embodiments, the value of $C_T$ is in the range of 0.75 MHz/C and the value of $C_\varepsilon \sim 500$ MHz/1% strain.

At block 506, the relative motion between the anomaly in the fiber under test and the probe source or heterodyne receiver may be determined during the recording of the Brillouin gain spectrum.

At block 508, the Brillouin scattering spectrum dynamically adjusting according to the relative motion between probe source and anomaly. In one example of generating an adjusted BGS, from a first trace to a last trace of a BGS may be collected where the $N^{th}$ trace of the BGS may be collected for a different frequency of $-\Delta v + m \times \delta v$: $I_{mN}(-\Delta v + m \times \delta v, x$ as follows $\rightarrow I'_{mN}(-\Delta v + m \times \delta v, x) = I_{mN}(-\Delta v + m \times \delta v, x - d_{mN})$, where $d_{mN}$ is the distance moved away along the direction of pulse launch since the $1^{st}$ trace scan at the $1^{st}$ frequency step, and $(-\Delta v, \Delta v)$ and is $\delta v$ the frequency range and step, respectively.

Figure 6:
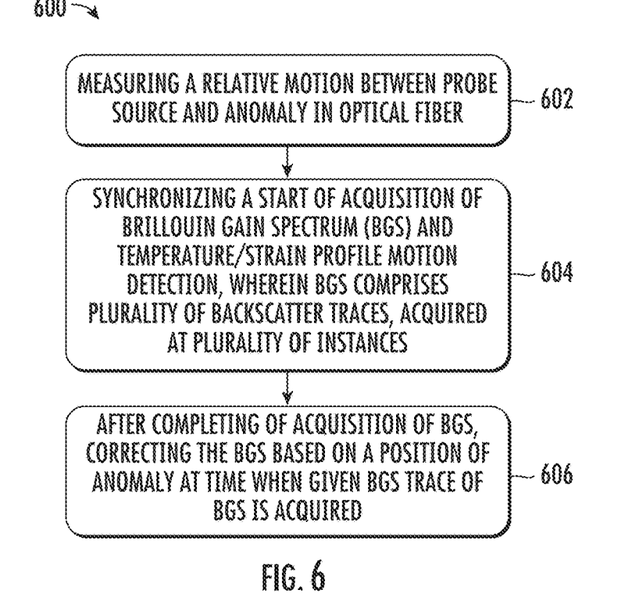
FIG. 6 presents an additional exemplary process flow.

FIG. 6 presents another exemplary process flow 600. At block 602 a relative motion is measured between a probe source an anomaly in an optical fiber under test. The probe source may be a laser source that launches a series of probe pulses that are directed to the anomaly. The anomaly may be a local temperature/strain profile in the optical fiber under test. At block 604, a start of acquisition of a Brillouin gain spectrum (BGS) is synchronized with the detection of motion of the temperature/strain profile. The BGS may constitute a plurality of backscatter traces, that acquired at a plurality of instances.

At block 606, after completing the of acquisition of the BGS, the BGS is corrected based on a position of the anomaly at a time when a given BGS trace of the BGS is acquired.

Figure 7:
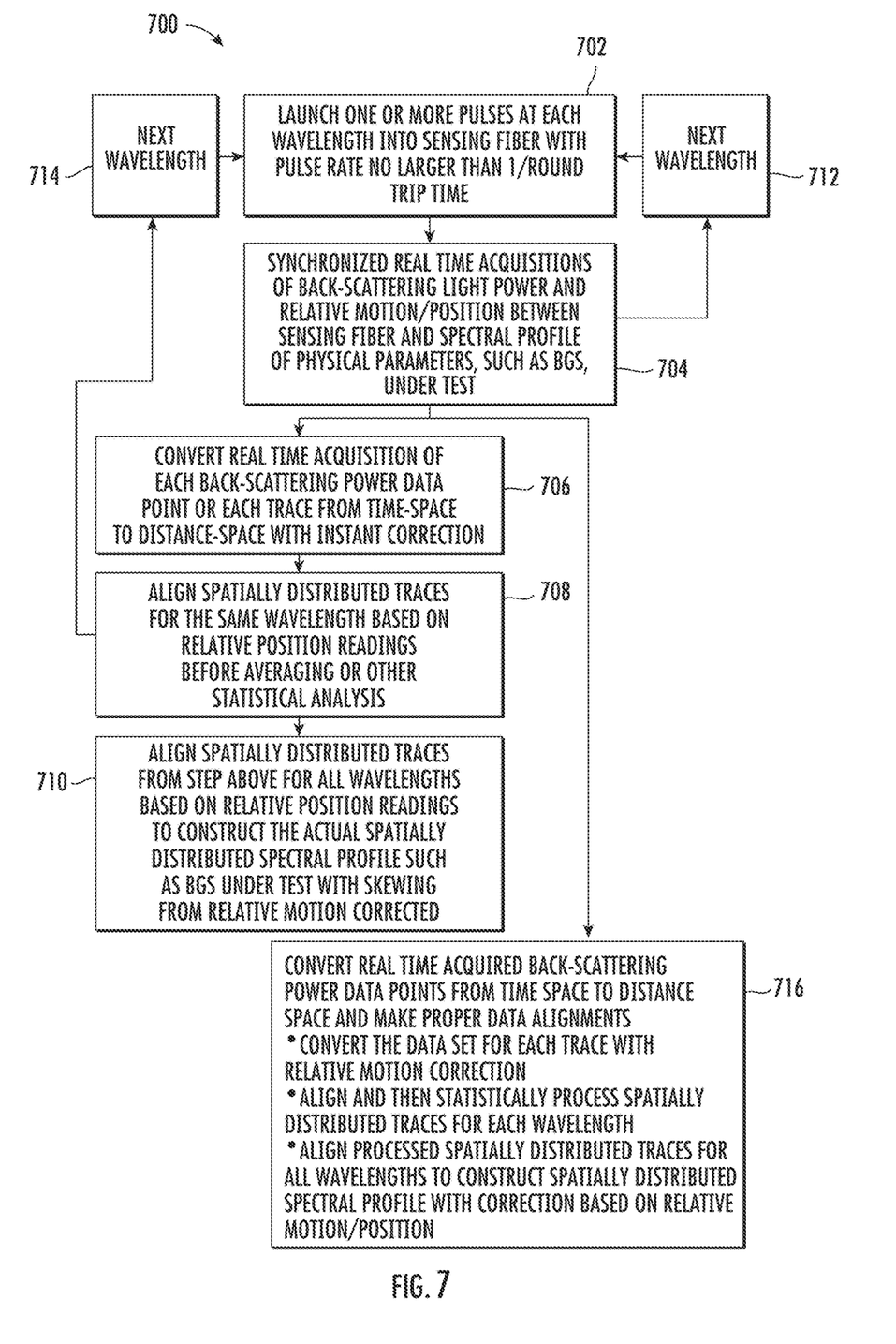
FIG. 7 presents a further exemplary process flow.

FIG. 7 presents a further exemplary process flow, shown as flow 700. At block 702 one or more pulses is launched at each wavelength into sensing fiber with a pulse rate no larger than 1/round trip time. At block 704 synchronized real time acquisitions of back-scattering light power and relative motion/position between sensing fiber and spectral profile of physical parameters, such as BGS, under test are performed. At block 706 the operation is performed to convert real time acquisition of each back-scattering power data point or each trace from time-space to distance-space with instant correction. At block 708 the operation is performed to align spatially distributed traces for the same wavelength based on relative position readings before averaging or other statistical analysis. At block 710, the operation is performed to align spatially distributed traces from step above for all wavelengths based on relative position readings to construct the actual spatially distributed spectral profile such as BGS under test with the skewing from relative motion corrected.

After block 704, the flow may proceed to block 712 to step to the next wavelength. After block 708, the flow may proceed to block 714 to step to the next wavelength. After block 704, the flow may proceed to block 716 where the operation is performed to convert real time acquired back-scattering power data points from time-space to distance-space and make proper data alignments. For example, the data set for each trace may be converted with relative motion correction, the operation may be performed to align and then statistically process spatially distributed traces for each wavelength, and the operation may be performed to align processed spatially distributed traces for all wavelengths to construct spatially distributed spectral profile with correction based on relative motion/position.

Figure 8:
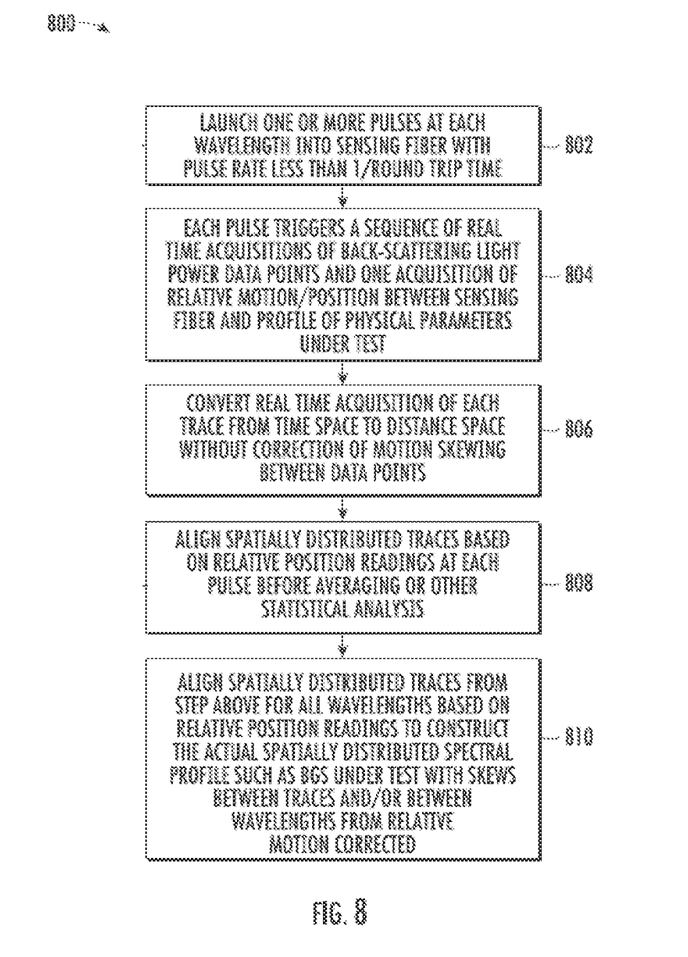
FIG. 8 presents another exemplary process flow.

FIG. 8 presents another exemplary process flow, shown as process flow 800. At block 802 one or more pulses is launched at each wavelength into sensing fiber with a pulse rate no larger than 1/round trip time. At block 804 each pulse triggers a sequence of real time acquisitions of back-scattering light power data points and one acquisition of relative motion/position between sensing fiber and profile of physical parameters under test. At block 806 real time acquisition of each trace is converted from time-space to distance-space without correction of motion skewing between data points. At block 808 align spatially distributed traces are aligned based on the relative position readings at each pulse before averaging or other statistical analysis is performed. At block 810 spatially distributed traces are aligned from the step above for all wavelengths based on relative position readings to construct the actual spatially distributed spectral profile such as BGS under test with skews between traces and/or between wavelengths from relative motion corrected.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s).

For example, the aforementioned techniques may be applied to any fiber optical distributed sensing of spectral profile of physical parameters, such as BGS with BOTDR and Raman spectrum with Raman-OTDR. Accordingly, it is intended that the present disclosure not be limited to the described embodiments, but that it has the full scope defined by the language of the following claims, and equivalents thereof.

The invention claimed is:

1. An apparatus, comprising:
a probe source;
a pulse modulator to receive first portion of a probe beam from laser, over an optical fiber, and to output a plurality of probe pulses to a fiber under test;
a heterodyne receiver arranged to receive second portion of the probe beam from the probe source, and arranged to receive a Brillouin back-scattered portion of the probe beam from an anomaly of the fiber under test;
and a digital processor, coupled to collect information from the fiber under test for determining a relative motion of the probe source with respect to the anomaly while performing a measuring of the Brillouin back-scattered portion of probe beam,
wherein the Brillouin back-scattered portion comprises a plurality of reflection signals generated in the fiber under test, responsive to the plurality of probe pulses, wherein the digital processor is arranged to: generate an adjusted Brillouin gain spectrum from the plurality of reflection signals, wherein the adjusted Brillouin gain spectrum comprises a graph depicting scattered intensity as a function of position of the anomaly and frequency of Brillouin scattering shift, wherein the digital processor is arranged to:

determine a relative motion between the fiber under test and the anomaly during the measuring of the Brillouin back-scattered portion; and adjust the Brillouin back-scattered portion according to the relative motion.

2. The apparatus of claim 1, the probe source comprising a probe laser.

3. The apparatus of claim 1, wherein a given pulse of the plurality of probe pulses is launched at a frequency $v_0$, wherein a given backscatter trace along the fiber under test is detected by the heterodyne receiver at a frequency VB, and wherein the Brillouin back-scattered portion spans a predetermined frequency range.

4. The apparatus of claim 3, wherein a given adjusted Brillouin gain spectrum is characterized for a first trace at a first frequency step as $-\Delta v$ as $I_{11}(-\Delta v, x) \to I'_{11}(-\Delta v, x) = I_{11}(-\Delta v, x)$, and for an $N^{th}$ trace at as $\Delta v$: $I_{1N}(-\Delta v, x) \to I'_{1N}(-\Delta v, x) = I_{1N}(-\Delta v, x-d_{1N})$, wherein $d_{1N}$ a distance moved away along a direction of a pulse launch since the $1^{st}$ trace at the $1^{st}$ frequency step.

5. The apparatus of claim 4, wherein a given adjusted Brillouin gain spectrum is characterized for a $N^{th}$ trace at $-\Delta v+m\times\delta v$: $I_{mN}(-\Delta v+m\times\delta v, x) \to I'_{mN}(-\Delta v+m\times\delta v, x) = I_{mN}(-\Delta v+m\times\delta v, x-d_{mN})$, where $d_{mN}$ is a distance moved away along the direction of pulse launch since the $1^{st}$ trace scan at the $1^{st}$ frequency step, $(-\Delta v, \Delta v)$ and $\delta v$ being the frequency range and step, respectively.

* * * * *